United States Patent [19]

Reale

[11] 4,324,865
[45] Apr. 13, 1982

[54] POLYURETHANE FOAMS HAVING LOW DISCOLORATION

[75] Inventor: Michael J. Reale, Brewster, N.Y.

[73] Assignee: Stauffer Chemical Company, Westport, Conn.

[21] Appl. No.: 255,142

[22] Filed: Apr. 17, 1981

[51] Int. Cl.³ .............................................. C08G 18/14
[52] U.S. Cl. .................................... 521/107; 252/182; 252/609; 521/117; 521/166; 521/170; 521/906
[58] Field of Search ............... 521/107, 117, 166, 170, 521/906; 252/182, 609

[56] References Cited

U.S. PATENT DOCUMENTS 3,706,680 12/1972 Booth .................................. 521/170
4,143,219 3/1979 Hensch ................................ 521/107
4,275,173 6/1981 Hinze .................................. 521/117

Primary Examiner—Maurice J. Welsh
Attorney, Agent, or Firm—Roger S. Benjamin

[57] ABSTRACT

Polyurethane foams prepared with chlorinated oligomeric phosphate ester or tris(dichloropropyl) phosphate flame retardants have low scorch and surface discoloration by addition of a mixture of phenothiazine and 4,4'-thio-bis(6-tertiary butyl meta cresol).

10 Claims, No Drawings

POLYURETHANE FOAMS HAVING LOW DISCOLORATION

FIELD OF THE INVENTION

This invention relates to flame retarded polyurethane foams. In particular, this invention concerns additives which minimize scorch and surface discoloration in polyurethane foams flame retarded with halogenated phosphoric acid esters.

BACKGROUND OF THE INVENTION

Polyurethane foams are typically prepared in large buns which are cured and sliced into sections for uses such as cushions, etc. A problem particularly in summer months is that heat of reaction in the center of the bun is not adequately dissipated and may result in scorching or loss of desirable physical characteristics. Moreover, scorching problems are frequently aggravated by the presence of halogenated phosphate ester type flame retardants.

U.S. Pat. No. 4,143,219 discloses the use of phenothiazine to reduce scorch discoloration in polyurethane foams containing halogenated phosphate ester flame retardants. Nevertheless, it is desirable to develop scorch resisting agents even more effective than phenothiazine. Furthermore, it has been noted that high levels of phenothiazine tend to produce unacceptable surface discoloration in flame retarded polyurethane foams under the influence of aging and exposure to actinic light.

SUMMARY OF THE INVENTION

This invention is a process for making flame retardant polyurethane foams which have low scorch and surface discoloration. This invention also comprises the flame retardant polyurethane foams produced by the process of this invention. In addition, this invention comprises a composition for flame retarding polyurethane foams while imparting desirable scorch and surface color properties.

The objects of this invention are attained by using 4,4'-thio-bis-(6-tertiary butyl meta cresol) in combination with phenothiazine in polyurethane foam compositions.

DETAILED DESCRIPTION OF THE INVENTION

The essential ingredients of the polyurethane foam making method and the polyurethane foam of this invention are (1) conventional polyurethane foam forming reactants, (2) halogenated phosphoric acid ester flame retardants, (3) phenothiazine, and (4) 4,4'-thio-bis(6-tertiary butyl meta cresol).

The essential ingredients of the composition for flame retarding polyurethane foams according to this invention are (A) halogenated phosphoric acid ester flame retardant, (B) phenothiazine, and (C) 4,4'-thio-bis-(6-tertiary butyl meta cresol).

The conventional polyurethane foam forming ingredients of the method of this invention are polyfunctional isocyanates in combination with hydroxyl-bearing compounds and blowing agent. Conventional polyurethane foams and foam forming systems are described in the *Encyclopedia of Chemical Technology* 3'd Ed., (Kirk-Othmer) Vol. 11, pgs. 87–89, 1980, ISBN 0-471-02064-8; the text of which is incorporated herein by reference.

The halogenated phosphoric acid ester flame retardant ingredient is selected from (i) tris(dichloropropyl) phosphate, and (ii) liquid poly(haloethylethyleneoxy) phosphoric acid ester which esters may be prepared by the reaction of ethanol, 2-chlorophosphate; $P_2O_5$ and ethylene oxide, or by the methods disclosed in U.S. Pat. Nos. 3,513,644, and 3,896,187. Mixtures of flame retardants (i) and (ii) are preferred. Particularly preferred is a flame retardant mixture containing two parts by weight of tris(dichloropropyl) phosphate and one part by weight of poly(haloethyl-ethyleneoxy) phosphoric acid ester.

The flame retardant ingredient is employed in polyurethane forming systems and polyurethane products in flame retardant effective amounts. An "effective amount" of flame retardants may be determined by testing a foam sample in a standard flame retardancy test such as the U.S. Department of Transportation Motor Vehicle Safety Standard 302, "Flammability of Interior Materials, Cars, Trucks, and Multiple Purpose Passenger Vehicles, Buses." Generally, flame retardant is employed from about 3 to 20 weight percent of the total weight of the polyurethane foam or polyurethane foam forming ingredients.

The use of phenothiazine in polyurethane foam formulations containing halogenated phosphoric acid ester flame retardants is described in U.S. Pat. No. 4,143,219, the disclosure of which is incorporated herein by reference. Phenothiazine is used in a polyurethane foam formulation in an amount effective to reduce scorch. Generally phenothiazine is used at a level of from about 0.25 to about 5.0 weight percent of the halogenated phosphoric acid ester flame retardant in the formulation.

The compound 4,4'-thio-bis-(6-tertiary butyl meta cresol) has been found to act synergistically with phenothiazine to reduce scorch and surface discoloration when employed in polyurethane foams containing halogenated phosphoric acid ester flame retardants. In particular, mixtures of 4,4'-thio-bis(6-tertiary butyl meta cresol) and phenothiazine are effective in reducing scorch and surface color in polyurethane foams containing tris(dichloropropyl) phosphate or poly(haloethyl-ethyleneoxy) phosphoric acid ester flame retardants.

The quantity of 4,4'-thio-bis-(6-tertiary butyl meta cresol) used in the practice of this invention is related to the quantity of phenothiazine used. 4,4'-thio-bis-(6-tertiary butyl meta cresol) is combined with phenothiazine in a proportion effective to reduce scorch below the level attainable by the use of a comparable quantity of phenothiazine used alone. Generally useful phenothiazine to 4,4'-thio-bis-(6-tertiary butyl meta cresol) weight ratios are in a range from about 1:3 to about 3:1 with a ratio of about 1:1 being particularly preferred.

The composition for flame retarding polyurethane foams according to this invention is prepared by simply mixing the halogenated flame retardant, phenothiazine and 4,4'-thio-bis-(6-tertiary butyl meta cresol) ingredients.

The composition for flame retarding polyurethane foams consists essentially of a mixture of (A) 0.25 to 5.0 weight percent phenothiazine, (B) 4,4'-thio-bis-(6-tertiary butyl meta cresol), and (C) halogenated phosphoric acid ester flame retardant as the balance of the composition; wherein the weight ratio of (A) to (B) is in the range from about 1:3 to about 3:1.

The method of the invention employing a mixture of phenothiazine and 4,4'-thio-bis-(6-tertiary butyl meta cresol) additives can be practiced in a number of ways. The mixture of additives can be added to the polyurethane reaction mixture ingredients separately or together in any order prior to or during polyurethane foam formation. An alternative method is to prepare a composition for flame retarding polyurethane foams which comprises the halogenated phosphoric acid ester flame retardants, phenothiazine, and 4,4'-thio-bis-(6-tertiary butyl meta cresol). This composition is conveniently added to the polyurethane foam forming ingredients at the time the foam is being prepared.

The following example illustrates the quantitative improvement in scorch related color change obtained by the use of the method and composition of this invention. In addition, it has been qualitatively observed that the surface discoloration due to aging and actinic light of polyurethane foam prepared according to this invention is improved in comparison to foams prepared with halogenated phosphoric acid ester flame retardant and phenothiazine in the absence of 4,4'-thio-bis-(6-tertiary butyl meta cresol).

EXAMPLE

A polyurethane foam forming formulation of the following composition was prepared:

| Ingredients | Parts by Weight |
| --- | --- |
| 3000 MW polyether polyol (Niax 16-56)* | 100.0 |
| Halogenated phosphoric acid ester flame retardant | 8.0 |
| 80/20 tolylene diisocyanate | 63.0 |
| Water | 5.0 |
| Phenothiazine | variable |
| 4,4'-thio-bis-(6-tertiary butyl meta cresol) | variable |
| Silicone surfactant (L5740)*, stabilizer | 1.2 |
| diazabicyclo-(2,2,2)-octane, catalyst | 0.1 |
| N-ethylmorpholine, catalyst | 0.2 |
| Stannous octoate, catalyst | 0.15 |

*Product of Union Carbide Corporation.

Experimental Procedure:

After mixing the above formulation the incipient foam formulation is poured into a 30.48 cm by 30.48 cm by 13.97 cm cardboard box and allowed to rise freely. At the completion of the rise the foam is placed in a microwave oven (Litton Model 414) and heated for four minutes. The foam is thereafter removed from the oven and allowed to cool for thirty minutes. The foam bun formed by this procedure is sliced in the center perpendicular to the direction of rise and a 2.54 cm thick slice cut from the bun. A 5.08 cm by 5.08 cm sample from the slice is removed for the foam evaluation.

Foam Evaluation Procedure:

A HunterLab Color/Difference Meter (Model D25D2) was used to give a numerical rating to three color characteristics compared to a foam prepared without flame retardant. The color difference $\Delta E$ was calculated according to the equation:

$$\Delta E = (\Delta L^2 + \Delta a^2 + \Delta b^2)^{\frac{1}{2}}$$

Where:
$\Delta E$ = color difference
$\Delta L$ = lightness compared to standard
$\Delta a$ = redness is positive, or greeness, if negative compared to a standard.
$\Delta b$ = yellowness, if positive, or blueness, if negative, compared to a standard The experimental procedure, foam evaluation procedure, and calibration of instruments used in this Example is more fully described in the article, *A Rapid, Predictive Test for Urethane Foam Scorch*, by Michael J. Reale and Barry A. Jacobs in the Journal of Cellular Plastics, November/December 1979 (Vol. 15, No. 6) published by Technomic Publ. Co., Westport, Conn.; the text of which is incorporated herein by reference.

The test results are set out in the Table below:

TABLE

| SAMPLE NO. | FLAME RETARDANT | % PHENO-THIAZINE | % THIO CRESOL** | $\Delta E$ |
| --- | --- | --- | --- | --- |
| Series A | | | | |
| 1 | FY99/FR2* | 0.25 | — | 21.85 |
| 2 | " | 0.25 | — | 22.53 |
| 3 | " | 0.50 | — | 24.05 |
| 4 | " | 0.50 | — | 21.13 |
| 5 | " | 1.00 | — | 14.88 |
| 6 | " | 1.00 | — | 10.33 |
| 7 | " | — | — | 35.75 |
| 8 | " | — | — | 36.97 |
| Series B | | | | |
| 9 | " | — | 0.25 | 32.31 |
| 10 | " | — | 0.25 | 29.71 |
| 11 | " | — | 0.50 | 26.35 |
| 12 | " | — | 0.50 | 29.94 |
| 13 | " | — | 1.00 | 25.89 |
| 14 | " | — | 1.00 | 26.62 |
| 15 | " | — | — | 35.74 |
| 16 | " | — | — | 35.18 |
| Series C | | | | |
| 17 | " | 0.0625 | 0.1875 | 28.10 |
| 18 | " | 0.0625 | 0.1875 | 24.36 |
| 19 | " | 0.1250 | 0.1250 | 6.99 |
| 20 | " | 0.1250 | 0.1250 | 9.50 |
| 21 | " | 0.1875 | 0.0625 | 17.31 |
| 22 | " | 0.1875 | 0.0625 | 22.89 |
| 23 | " | — | — | 28.67 |
| 24 | " | — | — | 27.23 |
| Series D | | | | |
| 25 | " | 0.125 | 0.375 | 6.87 |
| 26 | " | 0.125 | 0.375 | 9.16 |
| 27 | " | 0.250 | 0.250 | 5.73 |
| 28 | " | 0.250 | 0.250 | 6.32 |
| 29 | " | 0.375 | 0.125 | 12.40 |
| 30 | " | 0.375 | 0.125 | 13.11 |
| 31 | " | — | — | 28.12 |
| 32 | " | — | — | 21.09 |
| Series E | | | | |
| 33 | " | 0.250 | 0.750 | 12.74 |
| 34 | " | 0.250 | 0.750 | 13.84 |
| 35 | " | 0.500 | 0.500 | 6.87 |
| 36 | " | 0.500 | 0.500 | 4.97 |
| 37 | " | 0.750 | 0.250 | 13.97 |
| 38 | " | 0.750 | 0.250 | 16.10 |
| 39 | " | — | — | 22.45 |
| 40 | " | — | — | 25.19 |

*FY99/FR-2 is a mixture of two parts by weight of a liquid reaction oligomeric product of ethanol-2-chlorophosphate, P$_2$O$_5$ and ethylene oxide with 1 part by weight of 2-propanol, 1-3-dichlorophosphate.
**4,4'-thio-bis(6-tertiary butyl meta cresol).

In each series of experiments shown in the Table the reference used for determining color change was a foam prepared absent flame retardant, phenothiazine or 4,4'-thio-bis-(6-tertiary butyl meta cresol).

Samples No. 1 to 6 in Series A show the effect on color change of phenothiazine used alone. Samples 7 and 8 containing flame retardant absent color improving additives display higher $\Delta E$ values.

Samples 9 to 14 in Series B show the effect of 4,4'-thio-bis(6-tertiary butyl meta cresol) additive alone.

Samples 15 and 16 containing flame retardant absent color improving additive display higher ΔE values.

Samples 17 to 22 in Series C show the unexpected benefit of using phenothiazine and 4,4'-thio-bis-(6-tertiary butyl meta cresol) in combination at a total additive level of 0.25 weight percent. The benefit of the combination of additives is particularly strong when approximately equal weights of phenothiazine and 4,4'-thio-bis-(6-tertiary butyl meta cresol) additives are used. Control samples 23 and 24 containing flame retardant but absent the combination of color improving additives display higher ΔE values.

Samples 25 to 30 in Series D show the benefit of a combination of phenothiazine and 4,4'-thio-bis(6-tertiary butyl meta cresol) scorch additives at a total additive level of 0.5 weight percent. Control samples 31 and 32 containing flame retardant but no additive mixture display considerably higher ΔE values.

Samples 33 to 38 in Series E show the benefit of a combination of phenothiazine and 4,4'thio-bis(6-tertiary butyl meta cresol) scorch additives at a total additive level of 1.0 weight percent. Control samples 39 and 40 containing flame retardant but no additive mixture display considerably higher ΔE values.

What is claimed:

1. A method of making flame retardant polyurethane foams having improved scorch and surface discoloration properties by reacting an organic polyol and an organic isocyanate in the presence of a halogenated phosphoric acid ester flame retardant and phenothiazine, wherein the improvement comprises; adding to the reaction 4,4'thio-bis-(6-tertiary butyl meta cresol) in an amount effective to reduce scorch and surface discoloration.

2. The method of claim 1 wherein the weight ratio of phenothiazine to 4,4'thio-bis-(6-tertiary butyl meta cresol) is in the range of from about 1:3 to about 3:1.

3. The method of claim 1 wherein the halogenated phosphoric acid ester flame retardant is selected from the group consisting of tris(dichloropropyl) phosphate, oligomeric (haloethyl-ethyleneoxy) phosphoric acid ester, and mixtures thereof.

4. The method of claim 2 wherein the halogenated phosphoric acid ester flame retardant comprises from about 3 to about 20 weight percent of the total weight of reaction mixture and the phenothiazine comprises from 0.25 to 5.0 weight percent of the weight of said halogenated phosphoric acid ester.

5. A polyurethane foam prepared by the process of claim 1.

6. A polyurethane foam prepared by the process of claim 4.

7. A composition for flame retarding polyurethane foams consisting essentially of a mixture of the following ingredients:
  (A) 0.25 to 5.0 weight percent phenothiazine,
  (B) 4,4'-thio-bis-(6-tertiary butyl meta cresol),
  (C) halogenated phosphoric acid ester flame retardant as the balance of the composition;
wherein the weight ratio of (A) to (B) is in the range from about 1:3 to about 3:1.

8. The composition of claim 7 wherein the halogenated phosphoric acid flame retardant is selected from the group consisting of tris(dichloropropyl) phosphate, oligomeric (haloethyleneoxy) phosphoric acid ester, and mixtures thereof.

9. A method of making flame retardant polyurethane foam having improved scorch and surface discoloration properties by reacting an organic polyol and an organic isocyanate in the presence of a halogenated phosphoric acid ester flame retardant; wherein the improvement comprises adding to said organic polyol or said organic isocyanate a composition consisting essentially of a mixture of the following ingredients:
  (A) 0.25 to 5.0 weight percent phenothiazine,
  (B) 4,4'-thio-bis-(6-tertiary butyl meta cresol),
  (C) halogenated phosphoric acid ester flame retardant as the balance of the composition;
wherein the weight ratio of (A) to (B) is in the range from about 1:3 to about 3:1.

10. The method of claim 9 wherein the halogenated phosphoric acid flame retardant is selected from the group consisting of tris(dichloropropyl) phosphate, oligomeric (haloethyleneoxy) phosphoric acid ester, and mixtures thereof.

* * * * *